(12) United States Patent
Pinter et al.

(10) Patent No.: US 7,299,818 B2
(45) Date of Patent: Nov. 27, 2007

(54) INTEGRATED MICROVALVE AND METHOD FOR MANUFACTURING A MICROVALVE

(75) Inventors: Stefan Pinter, Reutlingen (DE); Tjalf Pirk, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 11/021,751

(22) Filed: Dec. 23, 2004

(65) Prior Publication Data

US 2005/0145279 A1 Jul. 7, 2005

(30) Foreign Application Priority Data

Dec. 23, 2003 (DE) ............... 103 60 654
Dec. 23, 2003 (DE) ............... 103 60 665
Feb. 19, 2004 (DE) ............ 10 2004 008 009

(51) Int. Cl.
*G05D 7/06* (2006.01)
*B81B 3/00* (2006.01)
*B81B 5/00* (2006.01)

(52) U.S. Cl. ............... 137/486; 137/15.18; 137/487.5; 251/129.01; 251/331

(58) Field of Classification Search ............ 137/15.18, 137/486, 487.5; 251/331
See application file for complete search history.

(56) References Cited

U.S. PATENT DOCUMENTS

| | | | |
|---|---|---|---|
| 5,244,537 A * | 9/1993 | Ohnstein | .................... 216/18 |
| 5,322,258 A | 6/1994 | Bosch et al. | |
| 5,441,597 A | 8/1995 | Bonne et al. | |
| 5,927,325 A * | 7/1999 | Bensaoula et al. | ...... 137/599.07 |
| 6,032,689 A * | 3/2000 | Tsai et al. | .................... 137/486 |
| 6,116,863 A * | 9/2000 | Ahn et al. | .................... 417/322 |
| 6,142,444 A | 11/2000 | Kluge | |
| 6,382,588 B1 * | 5/2002 | Hierold | .................. 251/129.04 |
| 6,626,417 B2 * | 9/2003 | Winger et al. | ......... 251/129.06 |
| 2004/0096992 A1* | 5/2004 | Harris et al. | .................. 438/11 |

FOREIGN PATENT DOCUMENTS

| | | |
|---|---|---|
| CH | 684209 | 7/1994 |
| DE | 44 00 315 C1 * | 1/1995 |
| WO | 2003/076331 | 9/2003 |

* cited by examiner

*Primary Examiner*—Ramesh Krishnamurthy
(74) *Attorney, Agent, or Firm*—Kenyon & Kenyon LLP

(57) ABSTRACT

An integrated microvalve has a substrate, a first function layer applied to the substrate, and a second function layer applied to the first function layer, the first function layer being designed as a diaphragm in at least one valve area, the second function layer being removed in the valve area and in a fluid discharge area, and an anvil connected essentially only to the diaphragm being exposed from the substrate in the valve area, a plate being applied to the second function area to form a valve space.

9 Claims, 5 Drawing Sheets

INTEGRATED MICROVALVE AND METHOD FOR MANUFACTURING A MICROVALVE

FIELD OF THE INVENTION

The present invention relates to an integrated microvalve for controlling the flow of a fluid. The present invention furthermore relates to a method for manufacturing such a microvalve.

BACKGROUND INFORMATION

Microfluidics is concerned with the transport and processing of small amounts of gaseous or liquid substances, known as fluids. Microvalves are provided for controlling the amount of transported substance. Such microvalves are used as flow limiters for liquids transported in microfluidic components.

In miniaturized fluid valves the reduced sealing surface areas quickly result in leakages in the event of particle contamination. Sealing may be achieved, for example, by a sufficiently high actuating force or a sufficiently large sealing surface area, which is difficult to achieve in an integrated form.

SUMMARY OF THE INVENTION

An object of the present invention is therefore to provide a microvalve which has a simple construction and is suitable for reliably controlling the fluid flow.

According to a first aspect of the present invention, an integrated microvalve is provided with a substrate having a first function layer applied to the substrate and a second function layer applied to the first function layer. The first function layer is designed as a diaphragm in one valve area. The second function layer is removed in the valve area and/or in a channel area. An anvil is exposed from the substrate in the valve area; this anvil is connected essentially only to the diaphragm. A plate is applied to the second function area to form a valve space. The diaphragm is pressed against a surface of the plate to seal the microvalve.

The microvalve according to the present invention has the advantage that it may be constructed in a simple manner just by applying two function layers onto a substrate and by structuring these layers in a suitable manner. The microvalve according to the present invention furthermore offers the advantage that the anvil formed by the first function layer in the valve area and from the substrate is movable from the outside using an actuator, so that the actuating force may be adjusted in a simple manner to the closed state of the valve, to its sealing state in particular.

The plate preferably has an orifice in the valve area for conducting a fluid, through which the fluid may be transported to and from the valve area.

As an alternative, the anvil may have a supply channel in the valve area for conducting the fluid. The fluid may be supplied and discharged through the substrate via this channel, so that the plate may be essentially unstructured when constructing the microvalve. This considerably facilitates the manufacture of the microvalve according to the present invention, because it is not necessary for two structured components to be connected in a certain precisely adjusted manner.

In particular, the second function area may have a fluid channel connected to the valve space formed in the valve area. In this way, the flow of the fluid to and from the microvalve may be formed by an integrated fluid channel.

The manufacture of the fluid channel may be connected in a simple manner with the manufacture of the valve area, in particular by etching the second function layer. The microvalve is preferably connected to a flow sensor via a fluid channel for measuring the fluid flow. In particular, the microvalve may be controlled as a function of the measured fluid flow.

The first and/or second function area is preferably applied as an epitaxial layer, in particular as a silicon epitaxial layer, onto the substrate.

According to a further aspect of the present invention, a method is provided for manufacturing a microvalve. For this purpose, a first function layer is applied to a substrate and subsequently an etch stop layer, at which a subsequent deep etching step stops, is applied to the first function layer in a valve area. A second function layer is then applied to the first function layer and to the etch stop layer. The second function layer is subsequently masked in such a way that the second function layer is removed in the valve area in a deep etching step. The second function layer in the valve area is deep etched according to the mask in a subsequent deep etching step. The substrate is structured in such a way, in particular using a trench etching process, that an anvil is formed, which is connected only to the first function layer. To finish the microvalve, a plate is applied to the second function layer to form the valve space.

This manufacturing method for a microvalve has the advantage that it is easy to implement and the essential structures may be implemented in a substrate having functional layers applied. The microvalve is formed by applying an essentially unstructured plate to the second function layer. It is furthermore possible to actuate the valve via an unintegrated actuator, which makes it possible to adjust the actuating forces to the requirements.

The first and/or second function layer is/are preferably applied by depositing polycrystalline silicon as an epitaxial layer.

The sealing plate is preferably applied to the second function layer by anodic bonding. This represents a relatively simple method for permanently bonding a plate, in particular a plate made of suitable glass such as borosilicate glass, to the second function layer made of a silicon material.

DETAILED DESCRIPTION

Figure 1A:
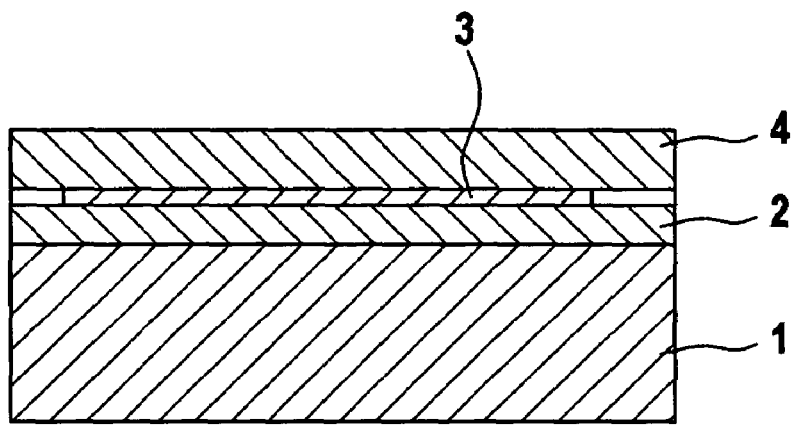
FIGS. 1a through 1f show a first embodiment of a method for manufacturing a microvalve.

FIGS. 1a through 1f show a method for manufacturing a microvalve according to a first embodiment of the present invention. In FIG. 1a, a first function layer 2 is deposited onto a substrate 1, preferably a silicon substrate 1. The first function layer is preferably made of polysilicon, which is preferably manufactured using an epitaxial deposition method as an epitaxial polysilicon layer having an epitaxial starting layer and an epitaxial polysilicon layer.

The thickness of first function layer 2 and thus the thickness of the diaphragm of the microvalve is accurately determined by the thickness of the deposited first function layer 2 and/or by a possible finishing surface treatment procedure (polishing).

An etch stop layer 3 is deposited on first function layer 2 and structured, thus defining a valve area. After being structured, etch stop layer 3 thus exists only at locations on the surface of first function layer 2 at which a subsequent deep etching process is to be stopped in order to form a diaphragm. A second function layer 4 is applied to first function layer 2 and etch stop layer 3, essentially in the same way as first function layer 2, preferably as an epitaxial polysilicon layer. In particular, the second function layer is made up of a second epitaxial start layer and a second epitaxial polysilicon layer. A planarization step may then follow to facilitate sealing of the channels after completion of the processing, using anodic bonding, for example.

Figure 1B:
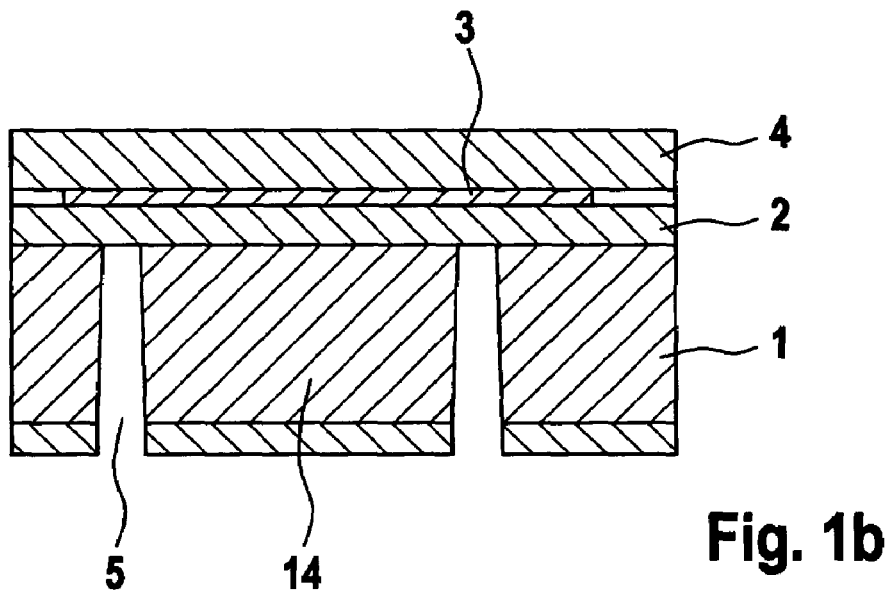

FIG. 1b shows that an anvil is exposed from the substrate by trench etching and is essentially connected only to first function layer 2. Anvil 14 is exposed by masking the surface of substrate 1 opposite the surface which has function layers 2, 4 applied and by subsequent trench etching. The depth of the trench etching process may be controlled via the etching time or by providing an etch stop layer (not shown) between the substrate and the first function layer where etching stops. The etch stop layer is provided either as a flat layer between the substrate and the first function layer or only at the locations of the trenches for anvil 14, depending on which other structures are integrated into the substrate. Anvil 14 is preferably provided with a circular cross section, so that the trenches shown form a circle around anvil 14.

Figure 1C:
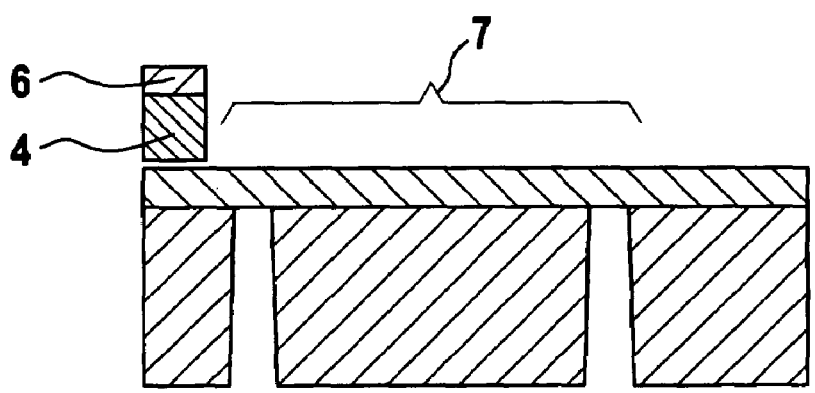

As shown in FIG. 1c, after structuring the substrate, the surface of second function layer 4 is masked using a masking layer 6 in such a way that the valve area and a channel area are excluded from a subsequent deep etching process. Masking layer 6 on second function layer 4 is formed for forming the microvalve essentially as a complement to the structuring of etch stop layer 3. The deep etching process etches second function layer 4 in the areas not covered by masking layer 6 as far as etch stop layer 3, thus exposing diaphragm 7 in the valve area.

Figure 1D:
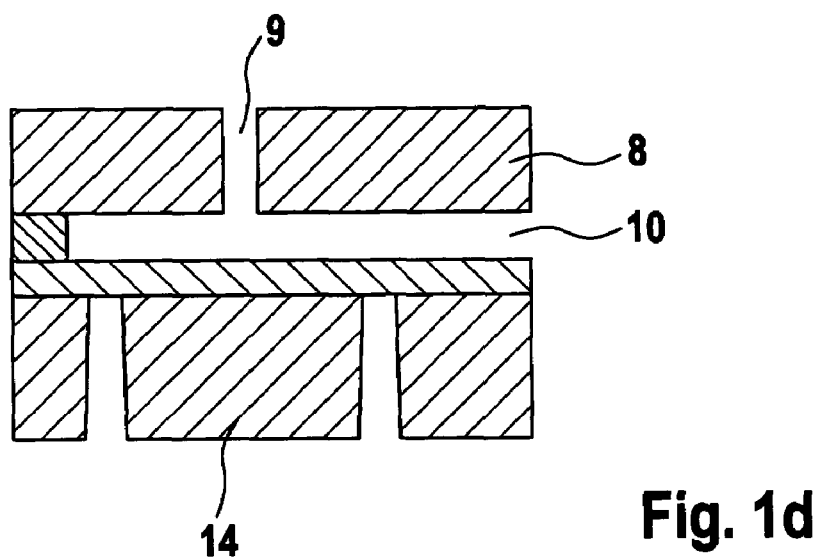

Subsequently a plate 8 having an orifice 9 in valve area 7 is applied to the remaining second function layer 4. The plate is preferably formed from a suitable glass and is preferably applied by anodic bonding to second function layer 4 made of silicon. A planarization process, for example, in the form of a polishing step, may be carried out before structuring function layers 2, 4, which also removes masking layer 6, to ensure that plate 8 essentially rests on all areas of second function layer 4 and is tightly bonded thereto. FIG. 1d shows the microvalve according to the first embodiment of the present invention in an open state, a fluid flowing through plate 8 via orifice 9.

Simultaneously with the structuring of the valve area of the microvalve, a fluid channel 10 may be formed by also removing at least second function layer 4 at the locations of fluid channel 10. Depending on whether fluid channel 10 is to have a larger cross section, the etch stop layer may be omitted in forming the fluid channel, so that, in addition to second function layer 4, parts of first function layer 2 or the entire function layer 2 may also be removed by controlling the intensity or the duration of the deep etching step.

Figure 1E:
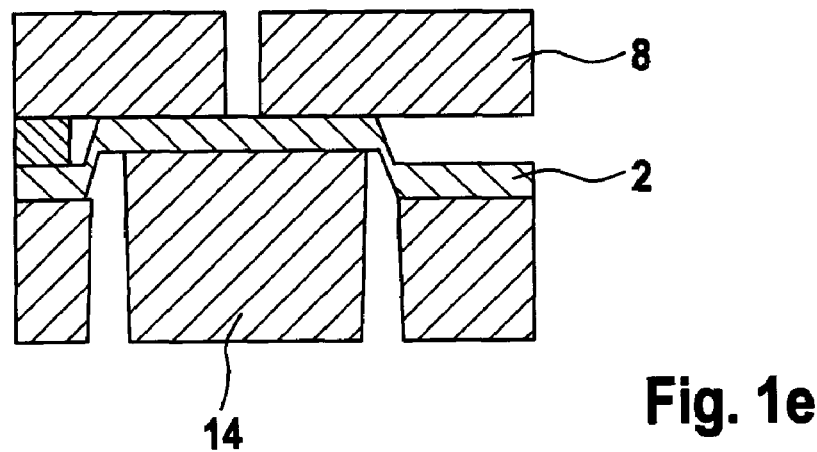

FIG. 1e shows the microvalve according to the present invention in a closed state. The diaphragm, together with the anvil, is pressed to bottom of plate 8 by an external actuator (not shown), so that the diaphragm is deformed in the area of the deep etchings in substrate 1 and seals orifice 9.

Figure 1F:
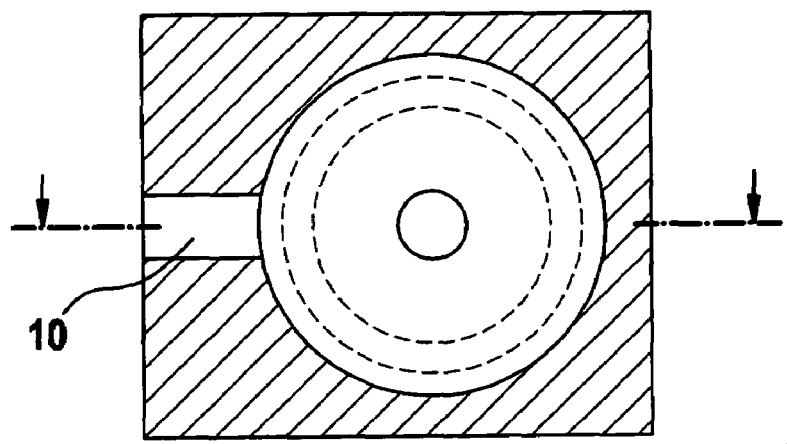

FIG. 1f shows a top view onto the microvalve according to the present invention. In this case, it has a round cross section, the diaphragm, i.e., the valve area formed by the anvil, being concentric to the orifice in plate 8.

Figure 2A:
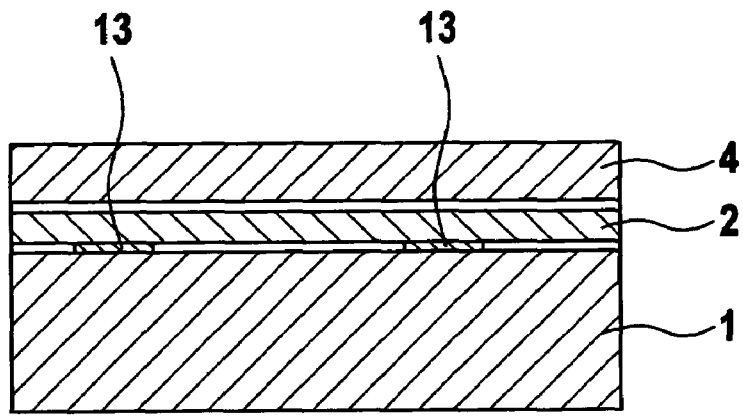
FIGS. 2a through 2f show a method according to a second embodiment for manufacturing a microvalve.
Figure 2B:
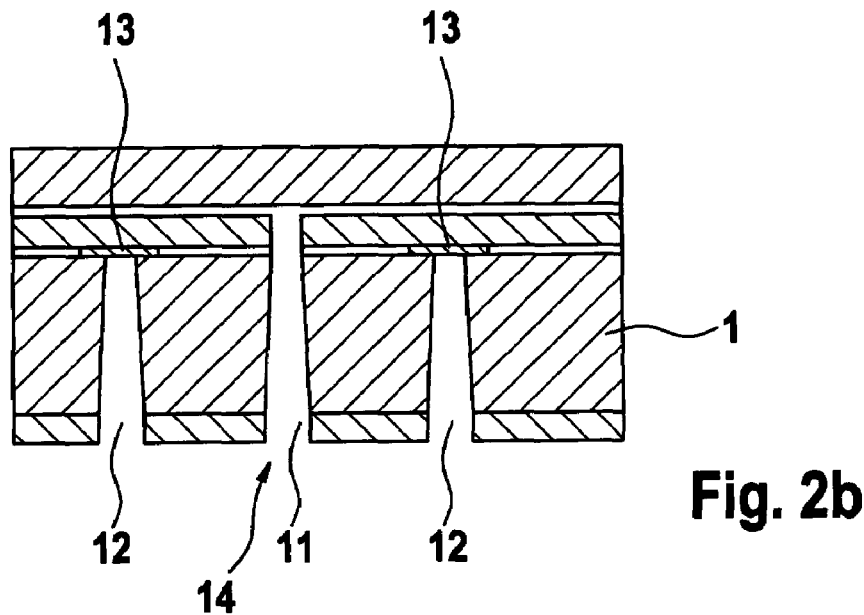

FIGS. 2a through 2f show the method for manufacturing a microvalve according to a second embodiment of the present invention. In FIG. 2a, essentially the same layer arrangement used for manufacturing the microvalve of the first embodiment is assumed. The anvil is etched into the substrate in the same way by a trench etching process, a fluid supply channel being etched through substrate 1 concentrically to the shape of the anvil, for example. The fluid supply channel passes through substrate 1 and first function layer 2. To end the trench etching process for exposing the anvil at the first function layer, the fluid supply channel, however, is etched as far as the second function layer, a further etch stop layer 13, which does not exist in the area of the fluid supply channel, may be formed in the area of trenches 12 between the substrate and first function layer 2. Etching the fluid supply channel is then only stopped at etch stop layer 3 between first function layer 2 and second function layer 4.

Figure 2C:
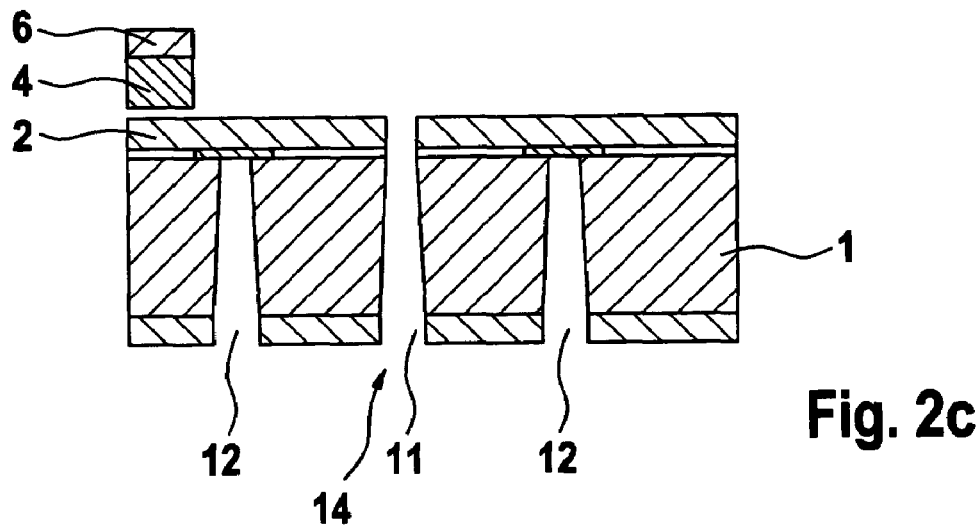

As FIG. 2c shows, after forming the anvil, second function layer 4 is etched as in the previously described process for the first embodiment. The valve area and fluid channel 10 are masked by masking layer 6 in such a way that these are accessible to a subsequent deep etching process. The deep etching process ends at etch stop layer 3, which is located in the valve area between first function layer 2 and second function layer 4.

The microvalve is finished by applying an unstructured plate, in particular a plate 12 made of a suitable glass, to second function layer 4. For example, plate 12 may be bonded to second function layer 4 using anodic bonding. For this purpose, second function layer 4 must be planarized in such a way that plate 12 rests essentially evenly on the entire surface of second function layer 4. This may be accomplished, for example, by a planarizing process such as polishing, which also removes masking layer 6.

Figure 2D:
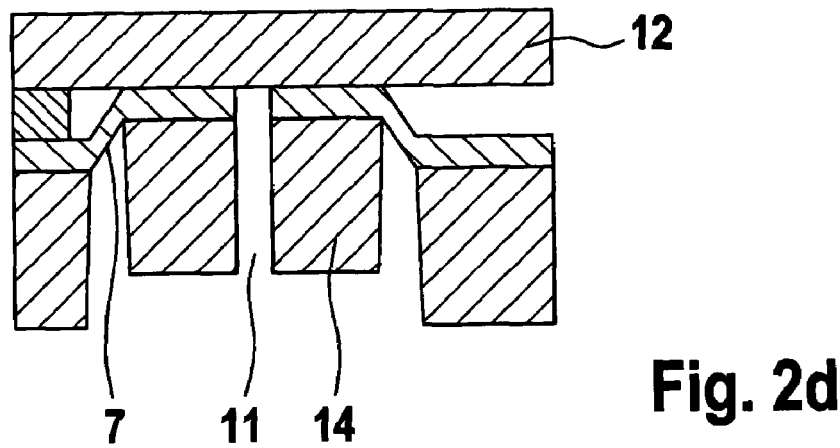
Figure 2E:
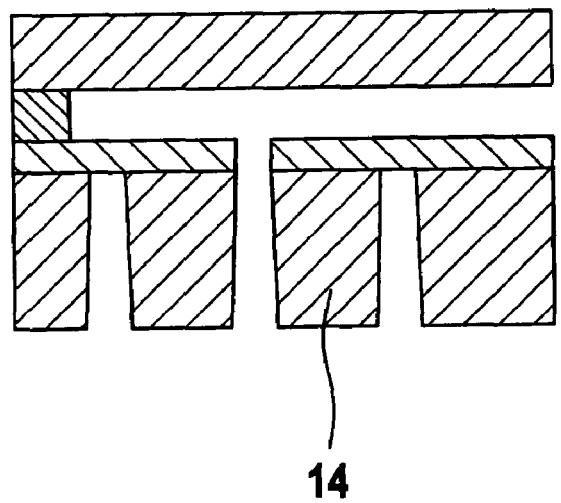
Figure 2F:
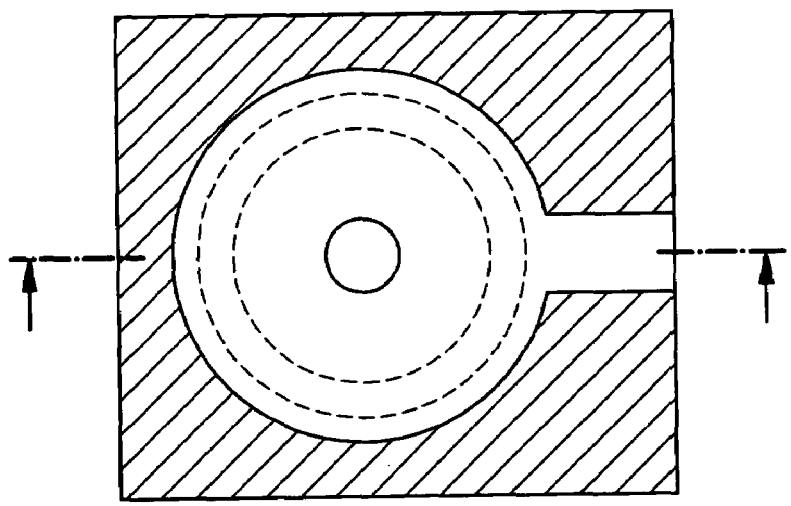

By actuating anvil 14, for example using an external actuator, diaphragm 7 is pressed to the surface of plate 12 associated with the substrate, and thus fluid supply channel 11 is closed. FIG. 2d shows the valve in a closed state, and FIG. 2e shows the valve in an open state. The fluid channel is manufactured as the microvalve of the first embodiment. FIG. 2f shows a top view onto the microvalve according to the present invention. It is apparent that plate 12 is essentially unstructured, so that no adjustment between the microvalve structure and sealing plate 12 is needed when manufacturing the microvalve.

Figure 3:
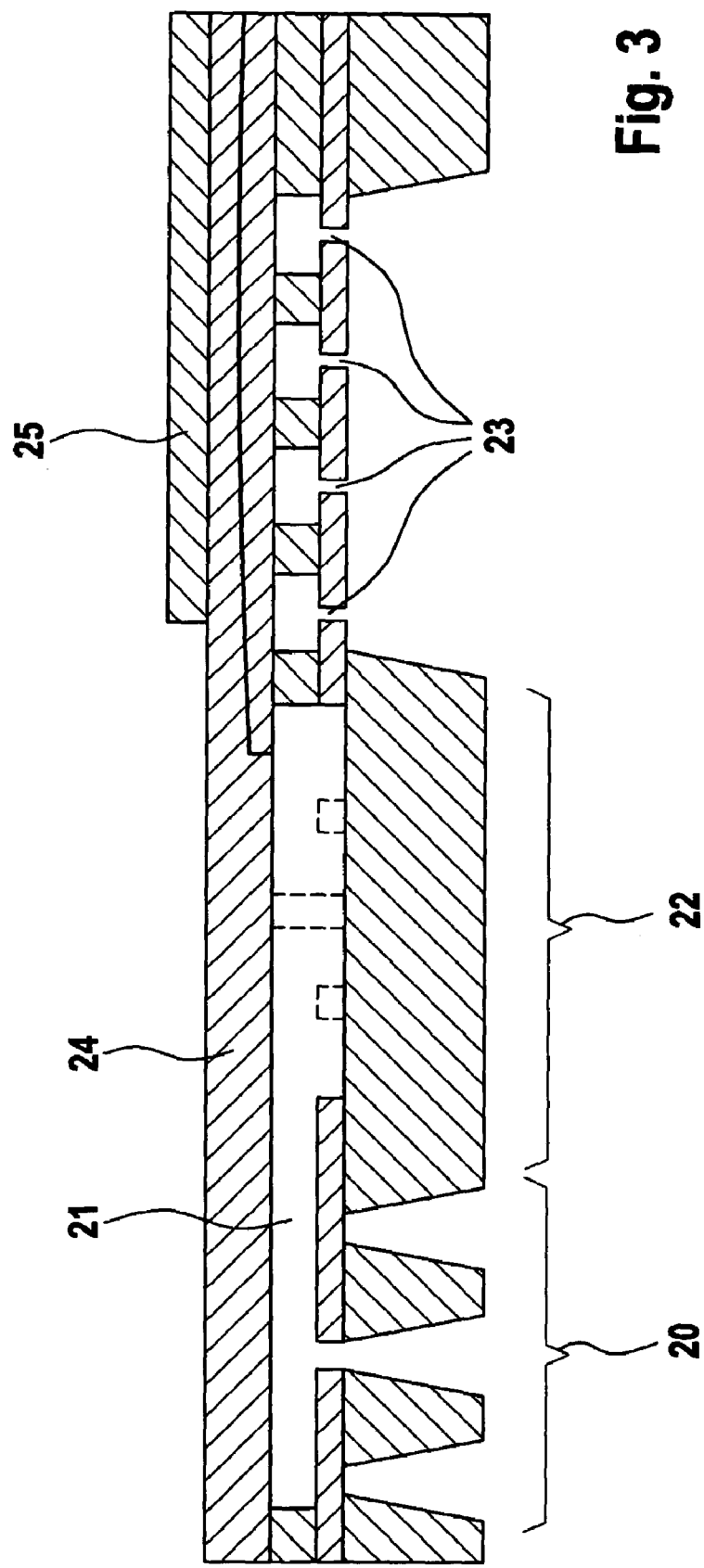
FIG. 3 shows a microvalve in combination with a flow sensor and integrated atomizing nozzles.

FIG. 3 shows an exemplary integrated fluidic component, in which a microvalve 20 according to the present invention is provided. Microvalve 20 is connected via a fluid channel 21 to a flow sensor 22 for measuring the fluid flow using the heating point method, for example. Piezoelectrically driven atomizing nozzles 23, which may be manufactured in the same way in the predefined layer structure, are located downstream from flow sensor 22. A piezoelectric actuator 25 for driving the atomizing nozzles is provided in or on plate 24 provided for sealing the microfluidic structures.

What is claimed is:
1. An integrated microvalve, comprising:
a substrate;
a first function layer applied to the substrate;
a second function layer applied to the first function layer, wherein:
the first function layer includes a diaphragm in at least one valve area,
the second function layer is absent in at least one of the at least one valve area and a channel area;
an anvil exposed from the substrate in the at least one valve area and connected only to the diaphragm; and a plate applied to the second function layer to form a valve space, the plate having a surface separated from the diaphragm by the valve space;

wherein the diaphragm is adapted to sealingly engage the surface of the plate to seal the microvalve.

2. The microvalve as recited in claim 1, wherein the plate includes an orifice in the valve area for conducting a fluid.

3. The microvalve as recited in claim 1, wherein the second function area includes a fluid channel connected to the valve space formed in the valve area.

4. The microvalve as recited in claim 1, wherein the microvalve is connected via a fluid channel to a flow sensor for measuring a fluid flow.

5. The microvalve as recited in claim 4, wherein the microvalve is controlled using a control unit as a function of the measured fluid flow.

6. The microvalve as recited in claim 1, wherein at least one of the first function layer and the second function layer is applied as an epitaxial layer.

7. The microvalve as recited in claim 6, wherein the epitaxial layer includes a silicon epitaxial layer.

8. The microvalve as recited in claim 1, wherein the anvil and the plate are arranged on opposite sides of the diaphragm.

9. An integrated microvalve, comprising:
a substrate;
a first function layer applied to the substrate;
a second function layer applied to the first function layer, wherein:
the first function layer includes a diaphragm in at least one valve area,
the second function layer is absent in at least one of the at least one valve area and a channel area;
an anvil exposed from the substrate in the at least one valve area and connected only to the diaphragm, the anvil including a supply channel in the valve area for conducting a fluid; and
a plate applied to the second function layer to form a valve space, the plate having a surface against which the diaphragm is pressed to seal the microvalve.

* * * * *